United States Patent
Bullinger et al.

(10) Patent No.: US 6,980,097 B2
(45) Date of Patent: Dec. 27, 2005

(54) METHOD AND DEVICE FOR ACTIVATING PASSENGER PROTECTION DEVICE

(75) Inventors: Wilfried Bullinger, Korntal-Muenchingen (DE); Harald Rudolf, Tuebingen (DE)

(73) Assignee: DaimlerChrysler AG, Stuttgart (DE)

( * ) Notice: Subject to any disclaimer, the term of this patent is extended or adjusted under 35 U.S.C. 154(b) by 373 days.

(21) Appl. No.: 10/181,256

(22) PCT Filed: Oct. 9, 2001

(86) PCT No.: PCT/EP01/11680

§ 371 (c)(1),
(2), (4) Date: Jul. 16, 2002

(87) PCT Pub. No.: WO02/30716

PCT Pub. Date: Apr. 18, 2002

(65) Prior Publication Data

US 2003/0100983 A1 May 29, 2003

(30) Foreign Application Priority Data

Oct. 10, 2000 (DE) .......................... 100 49 911

(51) Int. Cl.[7] .............................. B60Q 1/00; G08G 1/16; B60R 21/32
(52) U.S. Cl. ........................ 340/438; 340/435; 340/903; 180/167; 307/10.1; 280/735
(58) Field of Search ............................. 340/435, 438, 340/505, 10.1, 903; 180/167, 169; 367/91, 93, 909; 307/9.1, 10.1; 280/734, 735

(56) References Cited

U.S. PATENT DOCUMENTS

| 3,893,114 A | 7/1975 | Yamanaka et al. ........ 343/7 ED |
| 4,673,937 A | * 6/1987 | Davis ........................ 342/72 |
| 5,529,138 A | * 6/1996 | Shaw et al. ................ 180/169 |
| 5,835,007 A | 11/1998 | Kosiak ....................... 340/436 |
| 5,872,536 A | 2/1999 | Lyons et al. ............... 342/70 |
| 6,018,308 A | * 1/2000 | Shirai ......................... 342/70 |
| 6,097,332 A | * 8/2000 | Crosby, II ................. 342/72 |

FOREIGN PATENT DOCUMENTS

| DE | 44 24 878 A1 | 7/1994 |
| DE | 195 46 715 A1 | 12/1995 |
| DE | 197 29 960 A1 | 7/1997 |
| DE | 197 36 840 A1 | 8/1997 |
| DE | 197 54 220 A1 | 12/1997 |
| DE | 198 03 068 A1 | 1/1998 |
| DE | 198 51 981 A1 | 11/1998 |
| DE | 198 58 760 A1 | 12/1998 |
| EP | 0 728 624 A2 | 8/1996 |
| JP | 07195988 | 8/1995 |

(Continued)

OTHER PUBLICATIONS

PCT International Search Report and translation of relevant portions thereof.
German Search Report and translation of relevant portions thereof.

*Primary Examiner*—Donnie L. Crosland
(74) *Attorney, Agent, or Firm*—Crowell & Moring LLP

(57) ABSTRACT

In a method and apparatus for activating vehicle-occupant protection devices, an approach speed to a collision object is determined within a predefined proximity range of the vehicle surroundings. If the approach speed is above a threshold value, an anticipated impact time for a collision with the object is determined. A time range is determined on the basis of the anticipated impact time, a signal quality of at least one proximity sensor, driving dynamics and the geometry of a collision object being taken into account in this time range. The assigned vehicle-occupant protection devices are activated after occurrence of a positive plausible-confirmation check within the time range.

13 Claims, 1 Drawing Sheet

FOREIGN PATENT DOCUMENTS

| | | |
|---|---|---|
| JP | 07242153 | 9/1995 |
| JP | 08075772 | 3/1996 |
| JP | 11124004 | 1/1999 |
| JP | 11180249 | 7/1999 |
| JP | 11263190 | 9/1999 |
| WO | WO 98/15435 | 9/1997 |
| WO | WO 99/12779 | 3/1999 |
| WO | WO 99/38730 | 8/1999 |

* cited by examiner

METHOD AND DEVICE FOR ACTIVATING PASSENGER PROTECTION DEVICE

BACKGROUND AND SUMMARY OF THE INVENTION

This application claims the priority of German patent application 100 49 911.2, filed 10 Oct. 2000 (PCT International Application No. PCT/EP01/11680, filed 9 Oct. 2001), the disclosure of which is expressly incorporated by reference herein.

The present invention relates to a method and apparatus for activating vehicle-occupant protection devices based on the approach speed of the vehicle relative to a collision object.

In methods for detecting impacts, acceleration signals from an acceleration sensor are usually evaluated and, as a function thereof, a decision is made as to whether a safety-critical hazardous situation is present and the airbag and/or other vehicle-occupant protection devices should be triggered.

For example, German patent document DE 197 29 960 discloses a method which measures an acceleration signal of an acceleration sensor to detect impacts, particularly in a motor vehicle for activating vehicle-occupant protection devices. The acceleration signal or a signal derived therefrom (for example the integrated acceleration signal), is compared, with a settable triggering threshold.

For this method, at least one sensor, referred to as a pre-crash sensor, registers the change in relative speed and/or the relative distance from collision objects within a proximity range of the vehicle surroundings. If the pre-crash sensor detects a safety-critical state, such as an imminent impact, the triggering threshold for activating vehicle-occupant protection devices is reduced.

Such a pre-crash sensor is preferably assigned to each side of the vehicle, and the triggering threshold of the side airbag located on the corresponding side is reduced (or not reduced) as a function of the signals determined by this sensor.

With this method, if a safety-critical state is detected within a proximity range of the pre-crash sensor by comparison with corresponding threshold values, the triggering threshold for activating vehicle-occupant protection devices is reduced. However, the triggering does not take place until after the acceleration signal or the signal derived therefrom has exceeded this corresponding triggering threshold.

Because this method reduces the triggering threshold only as a function of the relative speed and/or the relative distance from collision objects, influences such as, for example, the signal quality of a proximity sensor or the size of a collision object, cannot be taken into account in determining the level of the triggering threshold. For example, in the case of large collision objects it is not always possible to ensure that the sensor has also registered the smallest possible distance (closest proximity) between the sensor and vehicle. For this reason, in such a case the approaching collision object may impact with the vehicle somewhat earlier than was originally calculated.

German patent document DE 195 46 715 discloses a system for triggering a side airbag in which at least one sensor integrated in each door in the bodywork generates a control signal for the triggering electronics of the airbag. In this sensor system, at least two sensors are arranged spaced apart, one next to the other, and are integrated in the door in the bodywork. Each sensor has a transmitter stage and receiver stage which emits a microwave signal whose antenna lobe has a small half-value width and is perpendicular to the surface of the door. The microwave signals reflected at an approaching collision object are fed to an evaluation unit for generating an enable pulse.

However, with such an airbag sensor system it has been found that the sensor devices are already actuated directly by the pre-crash sensors, which drastically increases the risk of incorrect triggerings (for example, in the case of near misses). Such incorrect triggerings are especially disadvantageous because, under certain circumstances, the ability of the driver to react, particularly in the case of near misses, is very important; and his ability is greatly impeded by safety devices which trigger or have triggered.

A method and apparatus for controlling a triggerable vehicle-occupant restraint device is disclosed in European patent document EP 0 728 624 A3. In this method, the crash acceleration is determined and a crash value, which depends on the sensed crash acceleration, is determined. The latter value is compared with a threshold value, that is varied as a function of at least one target range, a target approach speed and an angle of incidence; and a triggering signal is provided if the crash value determined is greater than the threshold value.

However, such reduction of the triggering threshold for acceleration sensors in the case of an imminent impact has the disadvantage that it can lead to premature triggering of the vehicle-occupant restraint device if the acceleration triggering threshold is reduced to such an extent that it is already exceeded in the time period before the impact. This can take place, for example, if the vehicle travels over an unevenesses in the ground or a kerb stone just before the actual obstacle sensed by the proximity sensor.

An accident involving a side impact proves particularly critical in practice if the vehicle skids and moves in the transverse direction. Especially in the case of side impact sensors with radar or infrared, there may be repeated incorrect alarm triggerings when the vehicle travels closely past collision objects such as-parked vehicles or oncoming traffic. As a result, the triggering threshold of the acceleration sensors in the vehicle is reduced unnecessarily, increasing the risk of incorrect triggering of airbags, for example.

The radar sensor described in EP 0 728 624 A3 must also continuously calculate the approach speed of possible collision objects, the distance from such objects, the angle in respect of them etc., thus requiring a high degree of expenditure on processing signals, and a high level of computing power. Moreover, in order to reliably detect a side impact, at least two such sensors are required on each side, which gives rise to relatively high costs.

One object of the present invention is therefore to provide a method and apparatus for activating a vehicle-occupant protection device which uses simple components.

Another object of the invention is to provide triggering of a vehicle-occupant protection device in a way which is precisely adapted to the particular hazardous situation.

These and other objects and advantages are achieved by the method and apparatus according to the present invention, which uses simple sensors to generate what is referred to as a "time window"; i.e., a time range for a triggering request, in which the plausibility of a triggering request is confirmed after a threshold value is exceeded. Thereafter, if appropriate, activation of the vehicle-occupant protection device or devices takes place.

The method according to the invention achieves very exact and precise triggering or activation of the vehicle-occupant protection devices, taking into account the driving dynamics, geometry of the collision object and the signal quality of the respective proximity sensor which is used. For this purpose, the variables to be determined do not need to be measured continuously, for example over a certain range. Rather, it is sufficient for a single measurement to be started at a definable distance from an object.

With a device according to the invention, such a method can be carried out using simple proximity sensors. Because the approach speed to a collision object, the distance from it and the angle with respect to it do not need to be calculated continuously, there is also no need for a high degree of expenditure on signal processing. Thus large computing power is unnecessary, and the apparatus according to the invention can be implemented with simple and cost-effective components.

Other objects, advantages and novel features of the present invention will become apparent from the following detailed description of the invention when considered in conjunction with the accompanying drawings.

DETAILED DESCRIPTION OF THE DRAWINGS

Figure 1:
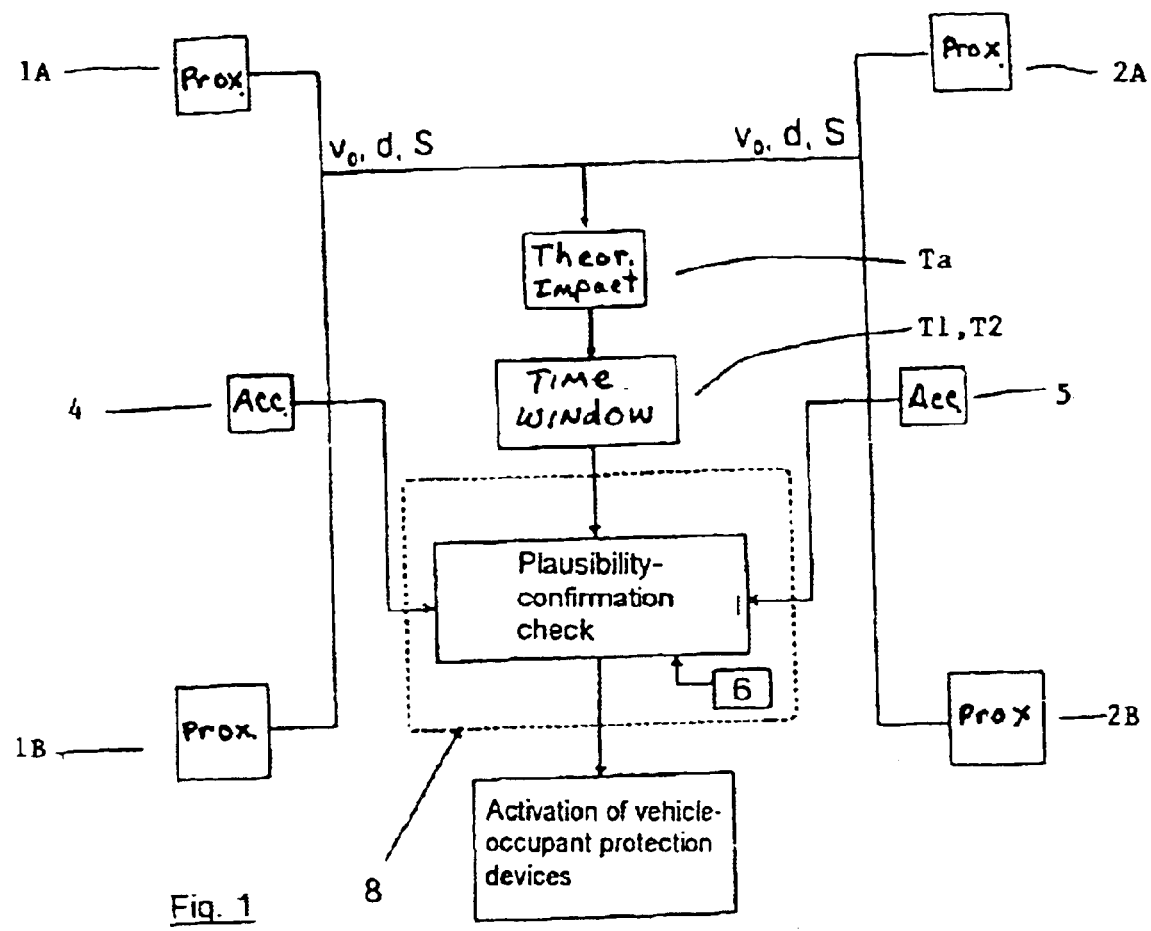
FIG. 1 shows a circuit diagram which illustrates a device for carrying out a method according to the invention.
Figure 2:
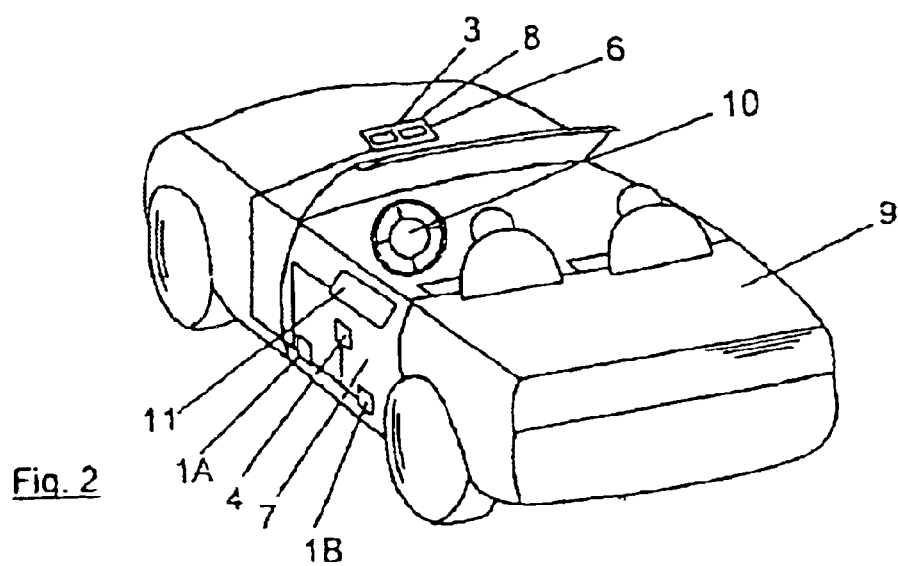
FIG. 2 shows a schematic perspective detail of a side structure of a motor vehicle with a device according to the invention.

The method and apparatus according to the invention will now be explained in more detail with reference to FIGS. 1 and 2.

To perform the method according to the present invention one or more proximity sensors 1A, 1B, 2A, 2B are used which are capable of determining the direction of movement of a collision object, the speed v of the collision object and the distance d of the collision object from the vehicle in question. This means that an approach speed $v_0$ (magnitude and direction) and the instantaneous distance d from the object are determined For present purposes, the distance d need not be measured continuously; rather it is necessary only to start a single measurement at a definable distance (for example approximately 1 m) when there is a risk of a side impact. A cost-effective radar sensor system which can be used for this purpose is disclosed, for example, in U.S. Pat. No. 5,872,536.

The sensor system is composed here, for example, of the proximity sensors 1A and 1B on one side of the vehicle 9 and 2A and 2B on the other side of the vehicle. Furthermore, an acceleration sensor 4, 5 is provided on each side of the vehicle. If the proximity sensors 1A, 1B and/or 2A, 2B detect a possible collision object within the predefined proximity range of the vehicle, a theoretical time Ta at which the impact of the vehicle 9 with the collision object would theoretically have to take place can be calculated in a first step, based on the measurement variables provided by such a sensor system if the approach speed $v_0$ which is determined is above a defined value $v_{min}$ (25 km/h, for example).

However, because the measured values of the sensor system are subject to a certain variation, and because other driving dynamic variables and vehicle geometry variables can also influence the time up to the impact, in a second step the theoretical impact time Ta is expanded to form a time window or time range around the time Ta, defined by a starting time T1 and an end time T2.

The driving dynamic variables can be obtained here by the proximity sensors 1A, 1B, 2A, 2B, while vehicle geometry variable values and a signal quality or variation S are predefined values (that is, they are inherent in the sensor).

The determination of the theoretical impact time Ta is carried out by the computer unit 3 based on the orthogonal components of the approach speed $v_0$, determined by the proximity sensor or sensors 1A, 1B, 2A, 2B, at a predefined distance d (and based on the distance d), according to the function:

$$Ta = d/v_0$$

The start T1 of the time window is then obtained from Ta and a correction factor K1 according to the function:

$$T1 = K1 \times Ta$$

K1 here is a function of the signal quality S of one or more of the proximity sensors 1A, 1B, 2A, 2B. When the signal quality S is very high, K1 is only slightly smaller than 1; when it is very low K1 is however typically in the range from 0.7 to 0.9.

If the proximity sensor 1A, 1B, 2A or 2B can differentiate between large and small collision objects, for example vehicles and posts, the value K1 is also reduced somewhat in the case of large collision objects, for which it is not always possible to ensure that the sensor has also sensed the smallest possible distance (closest proximity) between the sensor and the collision object. (In such a case, the approaching collision object possibly impacts somewhat earlier.)

The end of the time window T2 is obtained from the theoretical impact time Ta and a correction factor K2 according to the relation:

$$T2 = K2 \times Ta$$

K2 is firstly also obtained here from the signal quality S of the proximity sensor or sensors 1A, 1B, 2A, 2B. When the signal quality S is high, K2 is in turn only slightly larger than 1. On the other hand, when the signal quality S is low, the value K2 is typically in the range between 1.05 and 1.1.

In a collision with a second vehicle, the oncoming vehicle can, under certain circumstances, still brake, and therefore its approach speed continues to change in the time between the sensing at the distance d by the proximity sensor and the impact.

However, the proximity sensor 1A, 1B, 2A, 2B cannot signal the deceleration; accordingly, a further correction factor K3 is introduced, which prolongs the time window to such an extent that the impact lies within the time window even when there is a maximum deceleration. The end T2 of the time window is therefore a product according to the function:

$$T2 = K2 \times K3 \times Ta,$$

K3 being a function of the measured distance d and the approach speed $v_0$.

By way of example, at a distance d=1 m and an approach speed $v_0$=25 km/h the correction factor K3 is 1.10, while at the distance d=1 m and an approach speed $v_0$=72 km/h the correction factor K3 is 1.01.

A time window from T1 to T2 for a triggering a request of vehicle-occupant protection devices (for example a front airbag 10 or a side airbag 11) is therefore generated by means of signals of the proximity sensors 1A, 1B, 2A, 2B. If the signal of the acceleration sensor 4 or 5 in the computer unit 3 exceeds a fixed low threshold value, which confirms the plausibility of the triggering request within this time window T1, T2, corresponding vehicle-occupant protection systems 10, 11 are activated.

Instead of proximity sensors 1A, 1B, 2A, 2B it is also generally possible to use one or more internal pressure sensors in a door 7. The latter generate a time window for a triggering request of the vehicle-occupant protection systems 10, 11.

During the time window, (i.e., between the starting time T1 and the end time T2), a triggering request is issued by the proximity sensors 1A, 1B, 2A, 2B to the computer unit 3, which is part of an airbag controller 8 in the present case. If a plausibility-confirmation signal is also received within this time window T1, T2 at the computer unit 3 or the airbag controller 8, from one of the lateral acceleration sensors 4, 5 located in the vehicle 9, from a further acceleration sensor 6 in the airbag controller 8 or from other auxiliary sensors, arranged for example in a front region of the vehicle 9, the corresponding vehicle-occupant protection systems 10, 11 of the vehicle 9 are therefore activated immediately after positive plausibility confirmation checking.

The plausibility-confirmation signal according to the described preferred embodiment is an acceleration signal that is above a fixed, very low acceleration threshold. Alternatively, a signal which is equivalent thereto or is derived therefrom, and which corresponds in terms of its sign to the impact direction determined by the proximity sensors 1A, 1B, 2A, 2B, i.e., is in fact plausible.

For example, the following two tables illustrate a reduction in speed as a result of braking. A relative deceleration, (that is, by both the vehicle 9 itself and the collision object), of 1 g has been assumed here.

So that a time window for the triggering request of a vehicle-occupant protection device 10, 11 can be conceived according to the invention, at least two proximity sensors 1A, 1B should be provided because, depending on the situation, the measured speed corresponds only to the lateral speed.

TABLE 1

| v [km/h] | v [m/s] | t for 1 m [s] | dv over 1 m at 1 g [m/s] | dv [km/h] | dv [%] | v on impact [km/h] | Timing error during calculation t_impact [%] |
|---|---|---|---|---|---|---|---|
| 17 | 4.7 | 0.32 | 3.21 | 12 | 68 | 5 | 34 |
| 18 | 5.0 | 0.28 | 2.76 | 10 | 55 | 8 | 28 |
| 20 | 5.6 | 0.23 | 2.26 | 8 | 41 | 12 | 20 |
| 25 | 6.9 | 0.16 | 1.63 | 6 | 23 | 19 | 12 |
| 27 | 7.5 | 0.15 | 1.48 | 5 | 20 | 22 | 10 |
| 30 | 8.3 | 0.13 | 1.30 | 5 | 16 | 25 | 8 |
| 36 | 10.0 | 0.11 | 1.06 | 4 | 11 | 32 | 5 |
| 40 | 11.1 | 0.09 | 0.94 | 3 | 8 | 37 | 4 |
| 72 | 20.0 | 0.05 | 0.51 | 2 | 3 | 70 | 1 |
| 100 | 27.8 | 0.04 | 0.36 | 1 | 1 | 99 | 1 |

TABLE 2

| v [km/h] | v [m/s] | t for 1.4 m [s] | dv over 1 m at 1 g [m/s] | dv [km/h] | dv [%] | v on impact [km/h] | Timing error during calculation t_impact [%] |
|---|---|---|---|---|---|---|---|
| 20 | 5.6 | 0.39 | 3.86 | 14 | 70 | 6 | 35 |
| 25 | 6.9 | 0.24 | 2.45 | 9 | 35 | 16 | 18 |
| 30 | 8.3 | 0.19 | 1.90 | 7 | 23 | 23 | 11 |
| 36 | 10.0 | 0.15 | 1.51 | 5 | 15 | 31 | 8 |
| 40 | 11.1 | 0.13 | 1.34 | 5 | 12 | 35 | 6 |
| 72 | 20.0 | 0.07 | 0.71 | 3 | 4 | 69 | 2 |
| 100 | 27.8 | 0.05 | 0.51 | 2 | 2 | 98 | 1 |

In the timing window scheme illustrated in the tables for a triggering request, a side impact sensor or proximity sensor is used with a predefined proximity range (confirmation distance) of 1 m and approximately radial approach.

As is apparent from the tables, the timing error becomes greater the lower the speed v. For this reason, errors should only be taken into account at speeds above approximately 25 km/h as at lower speeds, and at best, what is referred to as a "no-fire" range occurs, that is, the assigned vehicle-occupant protection devices is not triggered below a minimum speed.

As is apparent from the tables, a time supplement owing to braking should be set at approximately 10% as all the collisions which occur later owing to the braking are no longer hazardous because sufficient deceleration has taken place.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for activating a vehicle-occupant protection device, said method comprising:
    determining an approach speed relative to a collision object that is within a predefined proximity range of the vehicle;
    if the approach speed is above a threshold value, determining an anticipated impact time for a collision with the object;
    determining a time range based on the anticipated impact time, and taking into account signal quality of at least one proximity sensor, driving dynamics and geometry of a collision object; and
    activating the vehicle-occupant protection devices after occurrence of a positive plausibility-confirmation check within the time range.

2. The method as claimed in claim 1, wherein a lower limit of the time range takes into account signal quality of the proximity sensor and geometry of the collision object.

3. The method as claimed in claim 1, wherein an upper limit of the time range takes into account signal quality of the proximity sensor and driving dynamics of the vehicle.

4. The method according to claim 1, wherein, for plausibility-confirmation checking, one of an acceleration signal and a signal which is equivalent to an acceleration signal is checked to determine whether it is above a predefined threshold and whether it corresponds in terms of its sign to an impact direction determined by the at least one proximity sensor.

5. The method according to claim 4, wherein the acceleration signal is determined by means of at least one acceleration sensor.

6. A device for activating a vehicle-occupant protection device, comprising:

at least one proximity sensor for determining an approach speed to a collision object within a predefined proximity of the vehicle; and a computer unit programmed to determine an anticipated impact time if the approach speed is above a threshold value;

determine a time range on the basis of the anticipated impact time, as a function of signal quality of the at least one proximity sensor, driving dynamics of the vehicle and geometry of the collision object; and activate an assigned vehicle-occupant protection device after a positive plausibility-confirmation check within the time range.

7. The device according to claim 6, wherein the at least one proximity sensor comprises at least one internal pressure sensor in a vehicle door.

8. The device according to claim 6, wherein in each case two proximity sensors and an acceleration sensor are provided in a front region and in a side region of the vehicle and in addition a further acceleration sensor is provided in an airbag controller.

9. A method for triggering a vehicle occupant system in a vehicle having an acceleration sensor for detecting a collision of the vehicle with an object when an acceleration of the vehicle exceeds a preset value, said method comprising:

determining a time window within which a collision may occur, based on proximity and approach parameter values for an object;

triggering said vehicle occupant protection system if an acceleration of the vehicle exceeds said preset value during said time window.

10. The method according to claim 9, wherein said determining of said time window is based on a determined theoretical collision time, and at least one of a signal quality of a proximity sensor which detects said object, driving dynamics of the vehicle and geometry of the object.

11. The method as claimed in claim 10, wherein a lower limit of the time range takes into account signal quality of the proximity sensor and geometry of the collision object.

12. The method as claimed in claim 10, wherein an upper limit of the time range takes into account signal quality of the proximity sensor and driving dynamics of the vehicle.

13. The method as claimed in claim 11, wherein an upper limit of the time range takes into account signal quality of the proximity sensor and driving dynamics of the vehicle.

* * * * *